United States Patent [19]

Brock et al.

[11] Patent Number: 4,927,575
[45] Date of Patent: May 22, 1990

[54] PROCESS FOR PRODUCING FOAM CUSHIONS

[75] Inventors: Martin Brock, Cologne; Pohlig Ralf, Leverkusen, both of Fed. Rep. of Germany

[73] Assignee: Bayer Aktiengesellschaft, Leverkusen, Fed. Rep. of Germany

[21] Appl. No.: 339,452

[22] Filed: Apr. 17, 1989

[30] Foreign Application Priority Data

Apr. 22, 1988 [DE] Fed. Rep. of Germany ....... 3813587

[51] Int. Cl.$^5$ .............................................. B29C 67/22
[52] U.S. Cl. .................................. 264/46.4; 264/45.1; 264/46.7
[58] Field of Search .................... 264/45.1, 46.4, 46.5, 264/46.6, 46.7

[56] References Cited

U.S. PATENT DOCUMENTS

| | | | |
|---|---|---|---|
| 3,516,901 | 6/1970 | Fultz et a. | 264/45.1 |
| 3,786,122 | 1/1974 | Berg | 264/54 |
| 4,190,697 | 2/1980 | Ahrens | 428/315 |
| 4,379,856 | 4/1983 | Samaritter et al. | 521/51 |
| 4,714,574 | 12/1987 | Tenhagen | 264/45.1 |

FOREIGN PATENT DOCUMENTS

| | | | |
|---|---|---|---|
| 2052907 | 10/1970 | Fed. Rep. of Germany . | |
| 58-101027 | 6/1983 | Japan | 264/46.6 |
| 58-203027 | 11/1983 | Japan | 264/45.1 |
| 59-054527 | 3/1984 | Japan | 264/46.7 |
| 62-277989 | 11/1987 | Japan | 264/46.4 |

Primary Examiner—Jan H. Silbaugh
Assistant Examiner—Allan R. Kuhns
Attorney, Agent, or Firm—Joseph C. Gil

[57] ABSTRACT

A process for producing foam cushions having sections of different hardnesses using foam molding. The process broadly includes introducing a first reaction mixture into a mold, introducing a second reaction mixture into a mold, said second mixture already being in a creamed state, allowing the reaction mixtures to foam, and removing the resultant product from the mold. Prior to the introduction of the first mixture, a web with holes in it is clamped over a deepened section of the mold cavity. The first reaction mixture is then fed onto the web, with the first mixture being in a sufficiently liquid state so as to allow it to flow through the holes and into the space below the web. The second reaction mixture is then fed into the space remaining above and to the sides of the web. The second mixture is introduced at a time when it is sufficiently creamed up so that it cannot flow through the holes in the web.

6 Claims, 1 Drawing Sheet

PROCESS FOR PRODUCING FOAM CUSHIONS

BACKGROUND OF THE INVENTION

The present invention relates to a process for producing foam cushions, and, in particular, polyurethane foam cushions, with sections of different hardnesses. In the process, at least two liquid reaction mixtures, which form foams of different hardnesses are fed one after another into a mold cavity. The second reaction mixture is already creamed up when it is fed into the mold. The foam cushion is then removed from the mold once the reactions are complete.

The production of foam cushions having sections of different hardnesses using foam molding techniques is known (see, e.g., U.S. Pat. Nos. 4,190,697 and 4,379,856, and European Patent Nos. 0,068,820 and 0,056,939). Common to these processes is the fact that the exact position and extension of the sections of different hardnesses is difficult to reproduce. Such processes therefore present problems in mass production, particularly in the automotive industry. Thus, the desired properties, such as side guide forces of cushioned seats for the passengers, cannot be obtained.

It is also known (see, e.g., German Offenlegungsschrift No. 2,052,907) that when producing cushions with sections of different hardness, a fabric should be inserted in the cavity of the mold. These fabric inserts are typically arranged vertically or slightly tilted. The different reaction mixtures are fed in simultaneously and on both sides of this insert. The reaction mixtures and the foams that are formed can penetrate into both sides of the insert. A perforation which allows the penetration of a highly liquid reaction mixture is not intended for these porous sheets.

The object of the present invention was to improve the above-mentioned processes with respect to the ability to reproduce the exact position and extension of the individual sections in the cushion produced.

DESCRIPTION OF THE INVENTION

Figure 1:
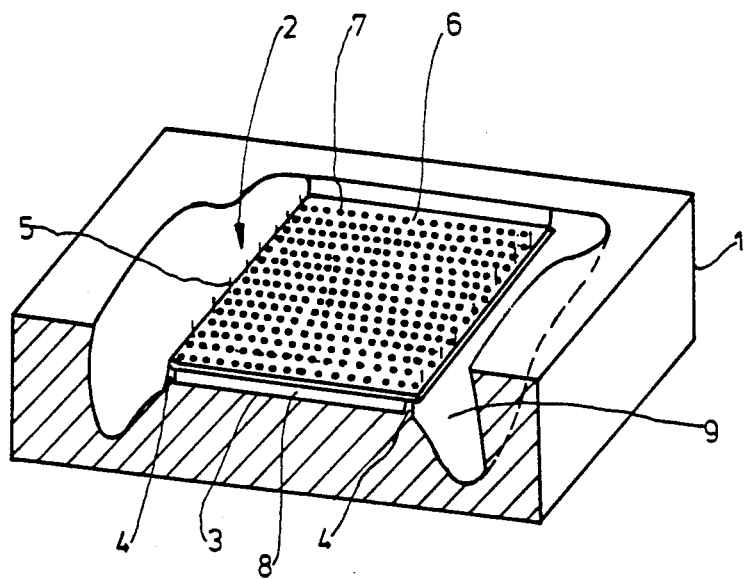
FIG. 1 is a view of the bottom half of an opened mold according to the present invention in three dimensions and in section.

The above object is achieved by clamping a web with holes in it over a deep section of the mold before the reaction mixtures are poured into the mold. The first reaction mixture is then poured onto the web at a time when the mixture is still so highly liquid as to flow through the holes into the space below the web. The second reaction mixture is then poured into the remaining portions of the mold. The second mixture is not introduced into the mold until it has reached such a creamy state that it cannot flow through the holes of the web. In this way, an exact division between the sections of different hardness can be obtained.

The most suitable material for the web is a thin plastic sheet with holes in it. The surface of the plastic sheet is preferably roughened to give better adhesion. Also suitable for use as a web are large mesh fabrics, knitted fabrics or fiber fleeces. For practical reasons the holes should be round o at least oval, so that there is no notching effect. In principle, however, square holes or even slits are also suitable.

The web can be fixed in the mold cavity in many ways. Adhesive strips can be attached to the edges of the webs and the web can then be fixed to the bottom or side wall of the mold. Another possibility is to attach thin needles to the bottom or side walls of the mold. The web can also be fixed by using hold-down frames. However, it is advisable to take care that the hold-down frames are not wetted by the reaction mixture, i.e. they must be removed before the second reaction mixture is added.

It is not always necessary to apply the second reaction mixture directly onto the web. If the mold has, for example, indentations for side elevations of a cushion, the second reaction mixture can be introduced directly into these indentations and can also extend over the middle of the mold cavity. Obviously, the second reaction mixture can be applied only onto the web or it can be applied both onto the web and onto (or into) any sections of the mold which are not already covered by the web when the second reaction mixture is introduced.

The choice of hole size and the number of holes per square meter depends on various factors, and in particular on the viscosity of the two reaction mixtures at the moment they contact the web. The optimum size and number can best be determined by trial and error. In most cases, good results are achieved when a web is used having at least 10,000 holes per square meter with the holes having a maximum hole size of 80 square millimeters. In general, the web should have no more than 160,000 holes per square meter. The minimum hole size is generally 3 square millimeters.

The web is preferably fixed to the barriers arranged in the mold for limiting the medium area of the seat cushion. This embodiment is obviously only possible with a suitably shaped mold cavity. With foam seat cushions for vehicles it is possible in the medium area of the seat cushion to benefit from the arrangement of two layers of foam having different hardnesses, one on the top of the other. This enhances both the comfort and the safety of the driver.

In a further particular embodiment of the process, the second reaction mixture is only applied to the web after the holes have been substantially fully closed by the foaming of the first reaction mixture. This can happen when the first reaction mixture, which has flowed through the holes of the web, is so foamed up that it seals the holes from below. It is also sufficient if the film of the first reaction mixture on the web has reached such a level of creaming up that the holes are substantially sealed. Regardless of which option is chosen, the second reaction mixture should be introduced into the mold at a time when the first reaction mixture is still sticky enough so that a good bond between the resultant foams can be achieved.

It is particularly advantageous to use a web which, in addition to the holes, has a perforation which is impermeable to the reaction mixtures. This perforation also has the advantage that the web improves the climate of the seat cushion as it does not act as a block for heat and moisture.

Often threads are layed on the barriers which threads serve as a fixing point for later cushioning. It also is possible to attach the perforated plastic sheets to these threads.

The process of the invention is also applicable to the production of cushions with back-foamed covers.

Reference will now be made to the drawings:

In FIG. 1 the bottom half of the mold 1 defines a mold area 2. Barriers 4 stretch out from the base 3 of the mold. These barriers are fitted with several thin needles 5 which fix a web 6 of plastic sheet. The plastic sheet 6 contains holes 7 having an area of 15 square millimeter per hole. The number of holes is about 40,000 per square meter. The surface of the plastic sheet 6 is roughened. The plastic sheet 6 has, in addition, a perforation (not shown), which is impermeable to the reaction mixtures. The medium area 8 of the seat cushion is defind by the area between the barriers 4. The side indentation areas 9 are on both sides of the medium area 8.

Figure 2:
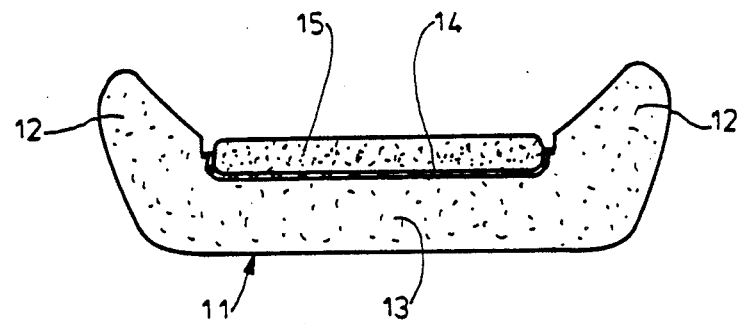
FIG. 2 is a sectional view of a cushion produced according to the process of the present invention using the mold of FIG. 1.

FIG. 2 shows a seat cushion for vehicles with a section 11 of harder foam, which surrounds the side elevations 12 and the bottom part 13. Above this area 13, there is the section 15 making up the medium area of the seat cushion, which is a more flexible foam. The more flexible foam and the bottom part 13 are separated by the perforated web 14.

What is claimed is:

1. In a process for producing a foam cushion having sections of different hardnesses using foam molding, comprising introducing a first reaction mixture into a mold cavity, introducing a second reaction mixture into the mold cavity, said second mixture already being in a creamed state, allowing the reaction mixtures to foam, and removing the resultant product from the mold cavity, the improvement wherein
   (i) prior to the introduction of said first reaction mixture, a web with holes in it is clamped over a deepened section of the mold cavity to provide a space below said web and a remaining space above and to the sides of said web;
   (ii) said first reaction mixture is fed onto said web, said first mixture being in a sufficiently liquid state such that it flows through said holes and into said space below said web; and
   (iii) said second reaction mixture is fed into said space remaining above and to the sides of said web, said second mixture being sufficiently creamed up so that it does not flow through said holes in said second web.

2. The process of claim 1, wheren said web has at least 10,000 holes per square meter, with a maximum hole size of 80 square millimeters.

3. The process of claim 2, wherein said web has no more than 160,000 holes per square meter, with a minimum hole size of 3 square millimeters.

4. The process of claim 1, wherein said web is attached to barriers arranged in the mold cavity, which bariers define a medium area of the foam cushion.

5. The process of claim 1, wherein said second reaction mixture is only brought into contact with said web after said holes have been almost completely closed by foaming up of said the first reaction mixture.

6. The process of claim 1, wherein said web has an additional perforation which is impermeable to said reaction mixtures.

* * * * *